Oct. 4, 1966     O. HANSEN, JR., ET AL     3,276,568
TRANSFER AND LABELING MACHINE
Filed April 26, 1965     6 Sheets-Sheet 1
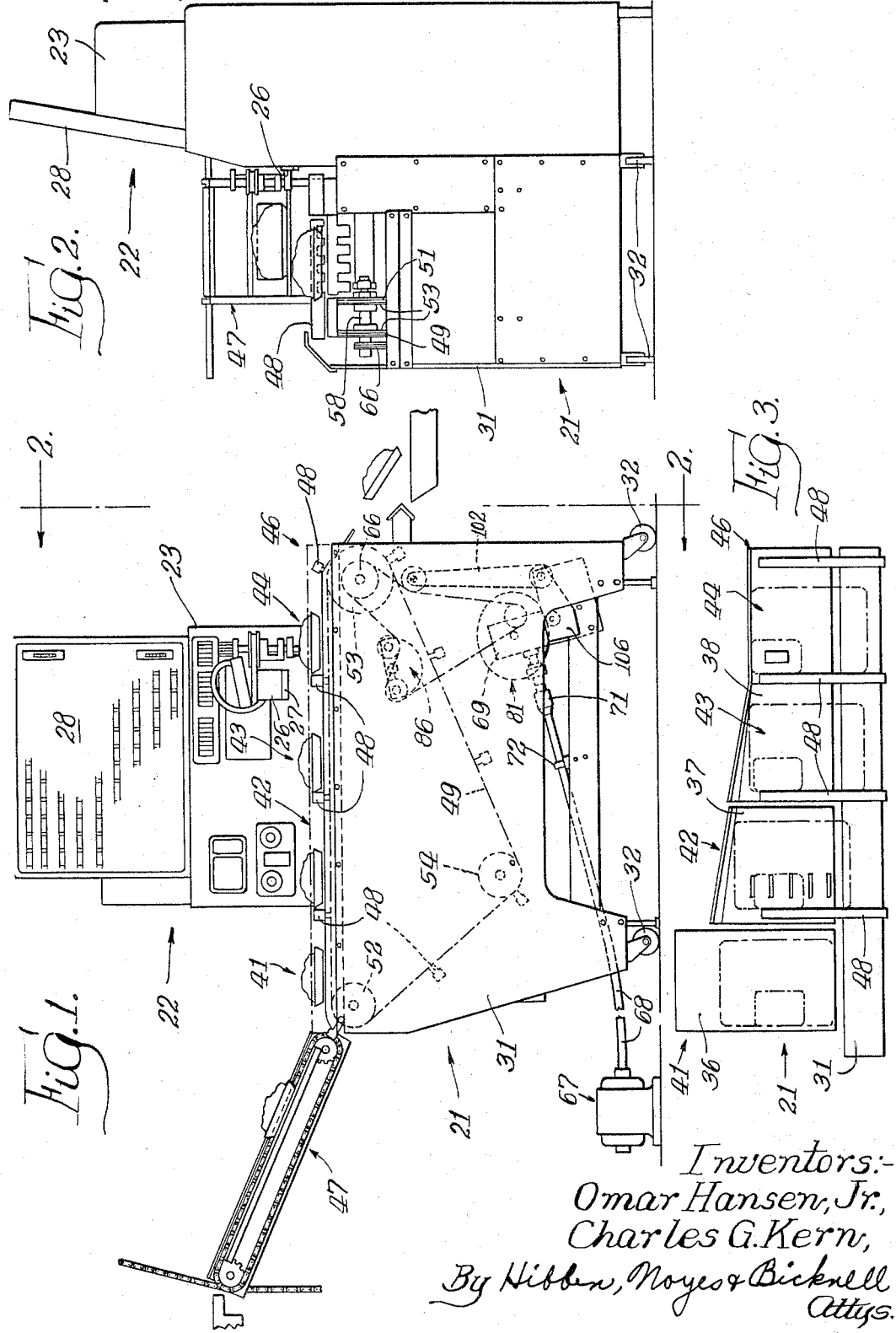
Inventors:-
Omar Hansen, Jr.,
Charles G. Kern,
By Hibben, Noyes & Bicknell
Attys.

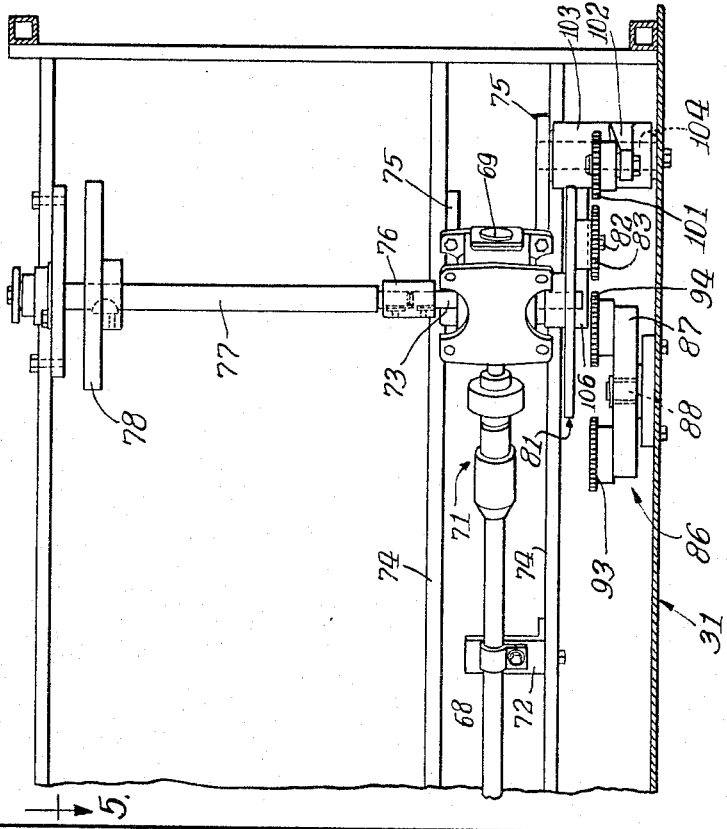

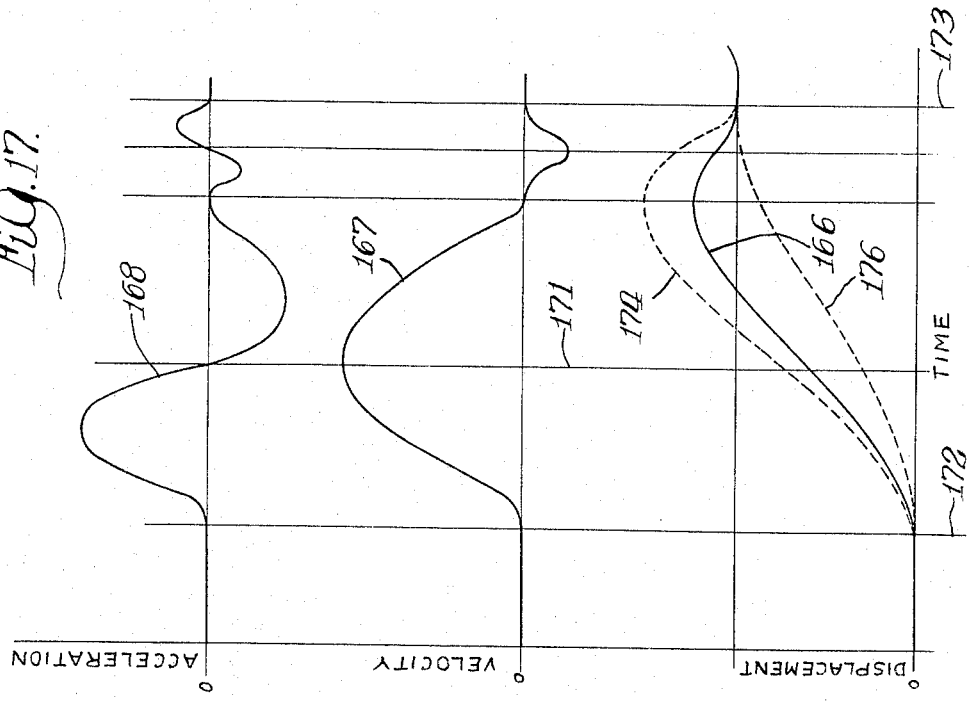
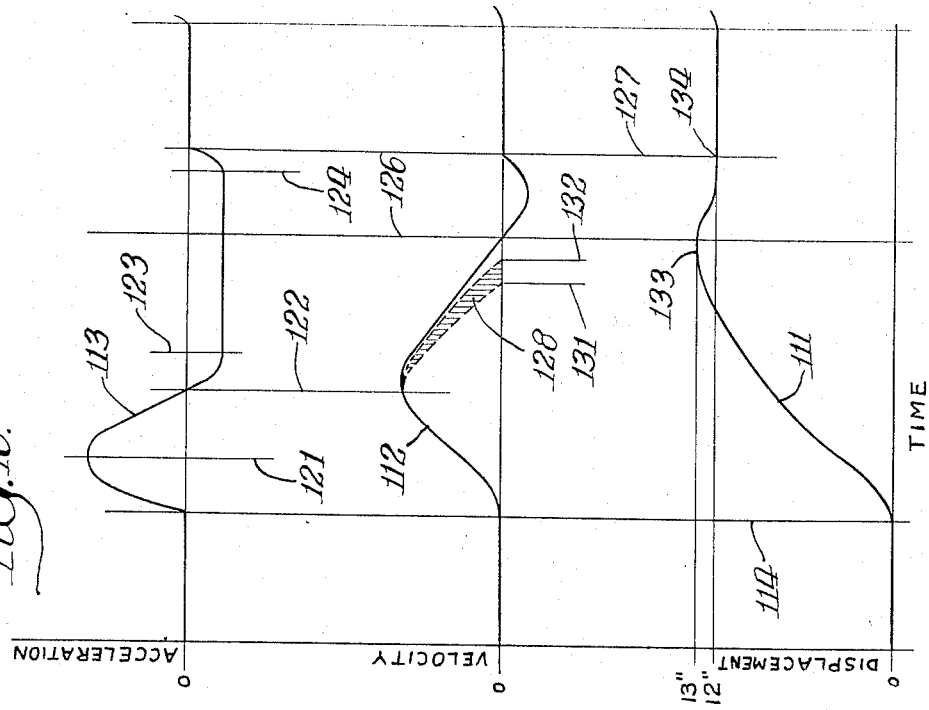

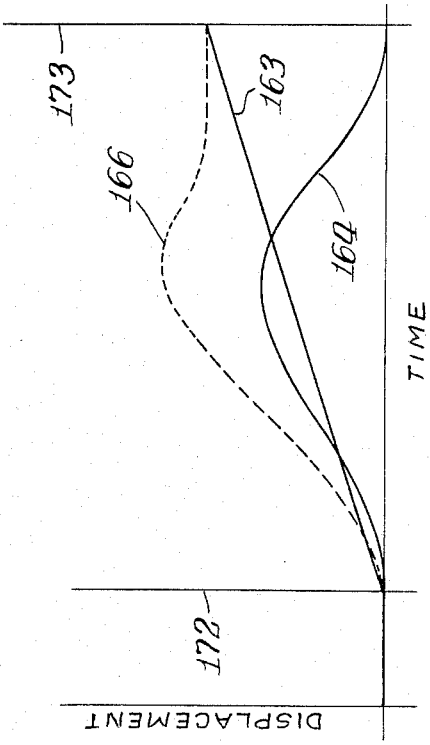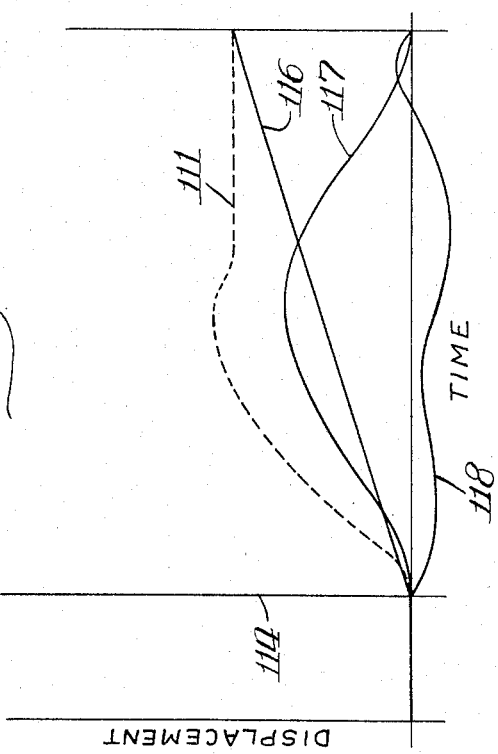

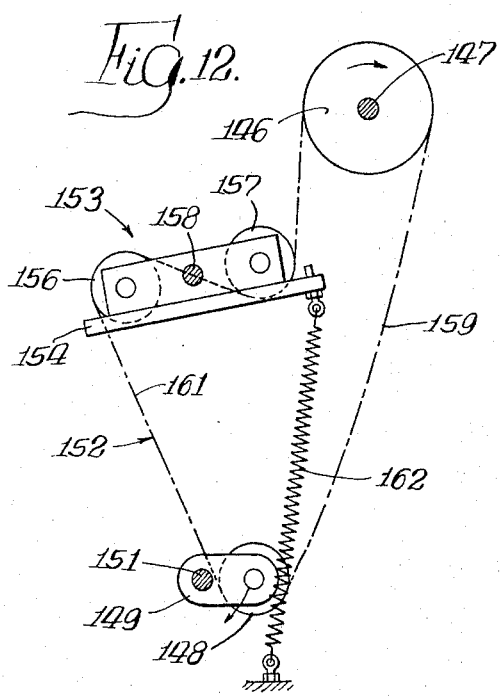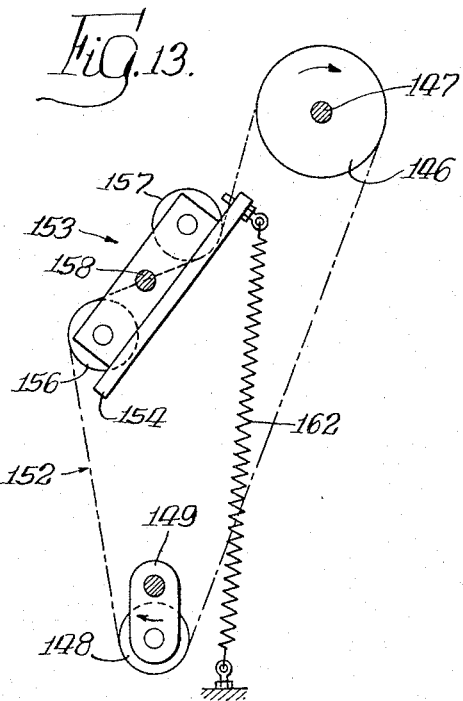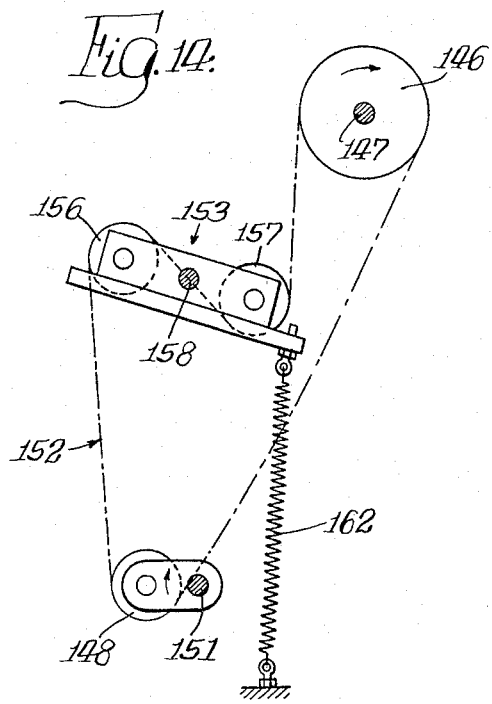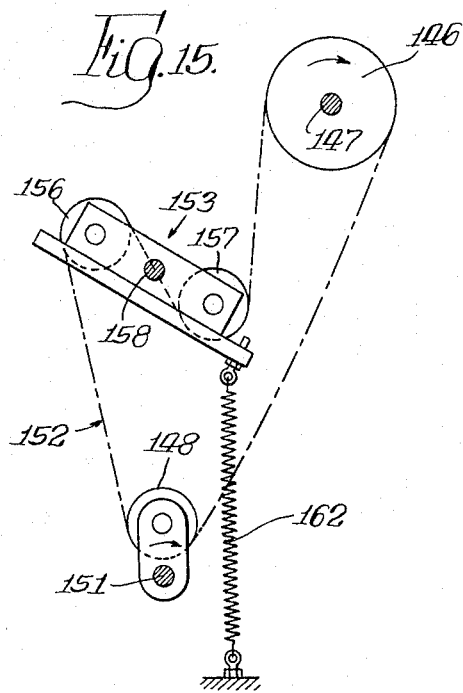

United States Patent Office 3,276,568
Patented Oct. 4, 1966

3,276,568
TRANSFER AND LABELING MACHINE
Omar Hansen, Jr., and Charles G. Kern, Bluffton, Ind., assignors to Franklin Electric Co., Inc., Bluffton, Ind., a corporation of Indiana
Filed Apr. 26, 1965, Ser. No. 450,627
15 Claims. (Cl. 198—110)

This invention relates to a machine for automatically handling packages of material such as food, and more particularly to a machine for sequentially moving packages to a scale for weighing them and then to a labeling position.

A transfer and labeling machine of the type described in pending U.S. patent application Serial No. 363,955, filed April 30, 1964, in the name of Omar Hansen, Jr., is designed to be used with a computer type scale which is operable to weigh a package, determine and compute information about the package, print the information on a label, and deliver the label to an accessible location. A transfer and labeling machine constructed as described in the above-mentioned patent application is designed to move a series of packages along a transport path onto the weighing platform of a scale, pause to enable the package to be weighed, move the package off the weighing platform to a labeling station, and then move the package away from the scale.

To increase the number of packages capable of being handled by the transfer and labeling machine, it is of course necessary to increase the speed at which the packages are moved along the transport path. The packages are pushed forwardly by transfer arms, and while it is a relatively simple matter to move a package ahead at a fairly rapid rate, it is more difficult to stop the package at a precise location once it has been set in motion. A package may tend to slide forwardly ahead of its associated transfer arm when the arm is stopped abruptly. This tendency to slide forwardly ahead of its arm is dependent of course upon the coefficient of friction between the package and the surface of the transport path, and this coefficient of friction may vary widely for different packages and under different operating conditions. For example, the following are some of the factors which affect the coefficient of friction between the package and the surface of the transport path: the ambient temperature, the ambient humidity, the cleanliness of the transport path, and the weight of the package. In the case of a wrapped package of food, the condition of the wrap on the bottom of the package and the composition of the wrapping material also has some effect.

In addition to the problem of pushing a package forwardly at as fast a rate as possible and then stopping it at a desired location without the package sliding ahead of the transfer arm, another problem that must be overcome is that, when working with a computer type scale, movement of the package on the weighing platform of the scale must be accomplished relatively quickly and abruptly. Computer type scales are designed to weigh out automatically when movement of the package on the platform has stopped for a fraction of a second. However, it has been found that if the package is moved relatively smoothly and slowly on the weighing platform of the scale, the scale may prematurely take a weight reading. The weight of a package recorded and printed on a label may therefore be incorrect or in some instances two readings may be taken, one when the package is moving slowly and a second when the package has stopped.

It is a primray object of this invention to provide a transfer and labeling machine for use with a computer type scale, having an improved drive mechanism which moves packages forwardly at a relatively fast rate but at the same time maintains constant control of the movement and the position of the package.

It is another object to provide apparatus of the foregoing character, wherein movement of the package onto the weighing platform of the scale is accomplished relatively abruptly and quickly so that an improper weight reading is not taken.

Other objects and advantages of the invention will become apparent from the following description taken in conjunction with the accompanying figures of the drawings, in which:

FIG. 1 is a side elevational view of apparatus embodying the invention;

FIG. 2 is an end elevational view taken on the line 2—2 of FIG. 1;

FIG. 3 is a top elevational view of a portion of the apparatus;

FIG. 4 is an enlarged elevational view of the drive mechanism of the apparatus;

FIG. 5 is a sectional view taken on the line 5—5 of FIG. 4;

FIGS. 10 and 11 show curves illustrating the operation of the drive mechanism;

FIGS. 12 to 15 are diagrammatic illustrations of an alternate form of the invention; and FIGS. 16 and 17 show curves similar to those of FIGS. 10 and 11 illustrating the operation of the form of the invention shown in FIGS. 11 to 14.

Figure 6:
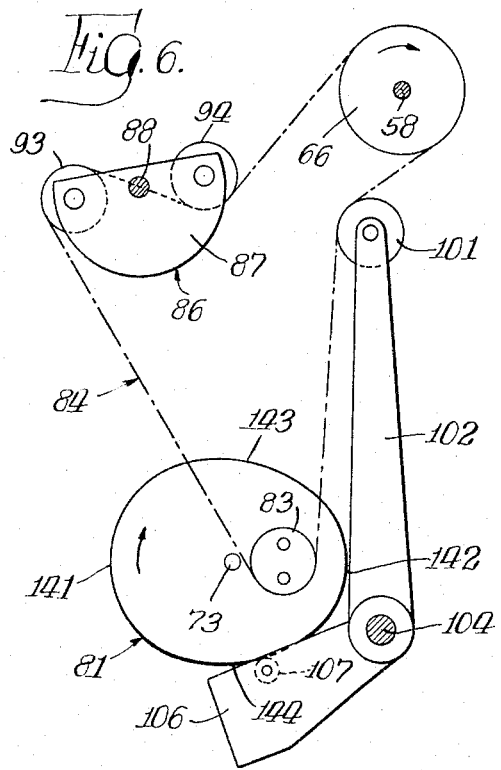
FIGS. 6 to 9 are diagrammatic views showing the operation of the drive mechanism.

Generally, a transfer and labeling machine of the type described in the above mentioned patent application is designed for use with a computer type scale, and when used with such a scale will automatically weigh and label a succession of packages. The scale includes a weighing platform, means for weighing a package positioned on the platform, means for computing information concerning the package, means for printing the information on a label, and a label chute which receives the printed label, the label chute being spaced forwardly in the direction of movement from the weighing platform.

The transfer and labeling machine comprises means forming a package transport path leading from an input station, where packages may be received from a wrapping machine, to a weighing station at the weighing platform of the scale, from the weighing station to a labeling station adjacent the label chute, and from the labeling station to an output station where the packages are discharged. A delay station is preferably also provided between the weighing and labeling stations to give the scale time to compute the information and print the information on a label, when the speed of the transfer and labeling machine is at or near the capacity of the scale. The transfer and labeling machine further comprises means for mounting and moving a plurality of transfer arms along the transport path, including a drive for causing the transfer arms to push packages from one station to the next and, at each station, to momentarily stop and back away from the package to permit undisturbed weighing and labeling of the packages. The rate of operation of the transfer and labeling machine may be adjusted such that the length of time required for the package to be moved from the weighing station to the labelling station substantially equals the length of time required for the scale to compute information, print the information on a label, and place the printed label in the label chute. The transfer and labeling machine further includes means for picking up a label in the label chute and attaching the label on a package.

The drive for moving the transfer arms along the transport path is constructed to move the transfer arm forwardly a predetermined distance, to stop and move rearwardly a short distance, to stop again, pause and then move forwardly again at the start of a new cycle. A package being moved along the transport path by one of the transfer arms is moved onto the weighing platform of the scale and the arm then moves rearwardly or away from the package a short distance to permit undisturbed weighing of the package. After weighing, the package is moved further along the transport path to the labeling station where movement again stops and a label is placed on the package. Subsequent forward movement of the transfer arm removes the package from the transfer and labeling machine at the end of the transport path.

In accordance with this invention the packages are pushed forwardly rapidly and nevertheless stopped quickly at exactly the desired locations. The position and movement of each package are therefore under constant control and the movement is such that the weighing operation is carried out properly.

In greater detail, a transfer and labeling machine embodying the invention is indicated by the numeral 21 in FIGS. 1 and 2, and is positioned for use with a computer type scale indicated by the numeral 22. The scale 22 may be a standard mechanism of the type manufactured by Toledo or Hobart, and includes a frame 23 on which is mounted a weighing platform, means within the frame 23 for computing the weight of and, if desired, price information concerning a package placed on the platform, means for printing the computed information on a label, and means for placing the label in a label chute 26 adjacent the machine 21. At the lower end of the label chute, the scale is ordinarily provided with a heater element 27 for heating a label placed thereon in order to activate the glue on the label. The scale 22 may also include a suitable plate rack 28.

The machine 21 comprises a generally rectangular frame 31 mounted on wheels 32 for movement about the floor, and it may also be equipped with adjustable screws adjacent the wheels 32 for levelling the machine when in operative position adjacent the scale 22. Extending longitudinally of the machine 21 along the top thereof is means forming a package transport path, the path being formed by a series of plates 36, 37 and 38 (FIG. 3). The plate 36 is at the beginning of the path and initially receives packages that are fed into the machine. The plate 37 constitutes the scale platform and is movable so that a package placed on the plate 37 will be weighed by the scale, the scale of course being adjusted to compensate for the weight of the plate 37. Forwardly of the plate 37, in the direction of movement of the packages, is the plate 38 which extends from the plate 37 to the forward end of the machine. Positions along the transport path may be designated an input station indicated by the numeral 41 (FIGS. 1 and 3), a weighing station indicated by the numeral 42, a delay station indicated by the numeral 43, a labeling station indicated by the numeral 44, and an output or discharge station indicated by the numeral 46. Articles may be fed into the machine at the input station 41 by means of an infeed conveyor 47 which in turn may receive the packages from a wrapping machine (not shown) of the character described in the Hansen et al. application Serial No. 363,954, filed April 30, 1964.

The machine 21 further includes a plurality of spaced apart transfer arms 48 for moving the packages along the transport path from one station to the next. The transfer arms 48 are attached to a pair of laterally spaced chains 49 and 51 (FIG. 2) each of which is mounted for movement in a vertical plane on three pairs of sprockets 52, 53 and 54. The two sprockets 52 are rotatably mounted on the frame 31 at the upper and rearward corner of the machine, the two sprockets 53 are located at the upper and forward corner of the machine and are secured to a shaft 58 (FIG. 2), the shaft 58 being mounted for rotation on the frame 31, and the two sprockets 54 are rotatably mounted on the frame 31 at a location spaced downwardly from and between the pairs of sprockets 52 and 53.

The drive for moving the chains 49 and 51 in the clockwise direction as seen in FIG. 1, and hence moving the transfer arms 48 from left to right across the upper surface of the transport path, includes a drive sprocket 66 (FIG. 4) which is secured to the shaft 58 and therefore is rigidly connected to the sprockets 49 and 51 and rotatable on the frame 31. Power for rotating the drive sprocket 66 in the clockwise direction is derived from a drive motor 67 (FIG. 1) which may also be connected to drive some of the mechanisms of a wrapping machine used in conjunction with the transfer and labeling machine 21, as described in the above referred to Hansen application Serial No. 363,955. The motor 67 is connected by a flexible drive shaft 68 to a speed reducer mechanism 69 (FIG. 4) through a suitable coupling 71, and the shaft 68 is supported on the frame 31 by a strap 72. The power output from the speed reducer unit 69 is connected to a main drive shaft 73 (FIGS. 4 and 5) which is rotatably supported by two horizontal braces 74 of the frame and a pair of generally vertical supports 75. One end of the main drive shaft 73 is connected by another coupling device 76 to a shaft 77 which drives a cam 78 used for example, to operate the label pickup mechanism previously referred to.

The other end of the main drive shaft 73 is rigidly secured to a generally egg-shaped cam 81 which has rigidly secured thereto, as by bolts 82, a sprocket 83. The center of the sprocket 83 is spaced from the axis of rotation of the drive shaft 73 and the cam 81, and the distance between the axis of rotation of the shaft 73 and the center of the sprocket 83 circumscribes a circle having as its center the shaft 73, as the cam 81 rotates. The portion of the cam 81 between the shaft 73 and the center of the sprocket 83 is referred to herein as an arm and has a length "D."

A chain 84 is trained around the sprocket 83, the drive sprocket 66 and a spring loaded takeup device 86. The spring loaded takeup device 86 comprises an arm 87 in the form of a half circle, which is pivotally connected to the frame 31 of the machine by a pin 88. Teeth may be formed on the arcuate peripheral portion 89 of the arm 87, and a chain 91 secured to the arcuate portion 89 meshes with these teeth. One end of the chain 91 is secured to the arcuate portion 89 and the other end of the chain 91 is connected to a tension spring 92 which has its other end secured to the frame 31 of the machine. As shown in FIG. 4, the connection between the chain 91 and the arm 87 is below the axis of the pin 88 and, therefore, the spring 92 urges the arm 87 in the clockwise direction around the axis of the pin 88.

Two takeup sprockets 93 and 94 are rotatably connected to the arm 87 on opposite ends of the pin 88, and the chain 84 is trained downwardly from the drive sprocket 66 underneath the sprocket 94, then upwardly and over the top of the other takeup sprocket 93, then downwardly and around the underside of the sprocket 83 and then upwardly to the sprocket 66. By this arrangement, as the sprocket 83 is rotated clockwise about the axis of the shaft 73, the spring 92 will move the arm 87 and the sprockets 93 and 94 to a maximum position in the clockwise direction when the distance between the centers of the two sprockets 66 and 83 is at a minimum, and the arm 87 and the two sprockets 93 and 94 will be at a maximum position in the counter clockwise direction when the distance between the sprockets 66 and 83 is at a maximum. The spring loaded takeup device 86 maintains a substantially constant tension on the chain 84 at all times.

Figure 7:
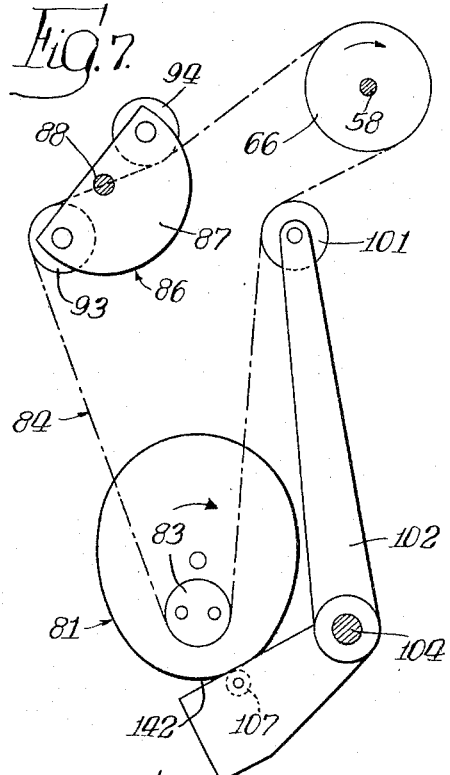
Figure 8:
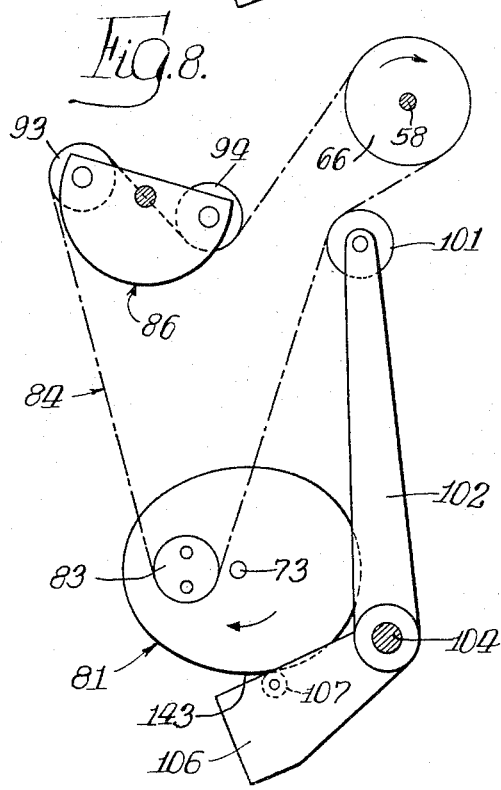
Figure 9:
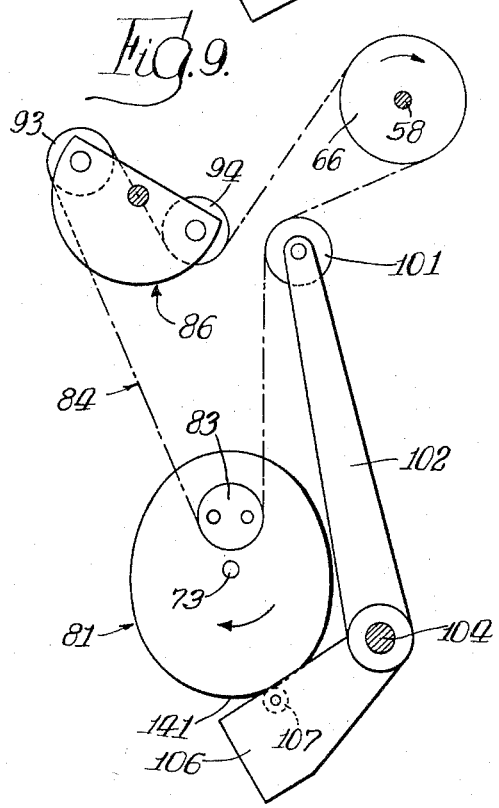

The section of the chain 84 between the sprockets 66 and 83, which is moving upwardly and is engaged by the spring loaded takeup device 86 is referred to herein as the idling side 96, and the section of the chain 84 which is moving downwardly from the sprocket 66 to the sprocket 83 is referred to herein as to the pulling side 97 of the chain 84. The spring loaded takeup device 86 engages the idling side 96 of the chain 84, and a cam actuated sprocket 101 engages the outside of the pulling side 97. The cam actuated sprocket 101 is rotatably mounted on the end of an elongated cam actuated arm 102 which is secured to a cam bracket 103. The arm 102 and the bracket 103 are pivotally mounted on the frame 31 of the machine by means of a pivot pin 104 and a weight portion 106 is formed on the bracket 103 to the left of the pin 104. The weight portion tends to rotate the arm 102 and the bracket 103 in the counter clockwise direction as seen in FIG. 4. Mounted on the portion 106 adjacent the cam 81 is a rotatable cam follower 107 which rotates on a pin 108. The weight portion 106 tends to move the sprocket 101 into the chain 84 but the pulling side 97 of the chain is generally sufficiently taut that the cam follower 107 is held against the peripheral cam edge of the cam 81. When the transfer and labeling machine is being used in conjunction with a wrapping machine, the speed reducer unit 69 is constructed such that the shaft 73 and the cam 81 turn one complete revolution for each cycle of the wrapping machine. The shaft 73 and the cam 81 are rotated in the clockwise direction as seen in FIG. 4, and since the sprocket 83 is rigid with the cam 81 and meshes with the chain 84, rotation of the shaft 73 moves the chain 84 in the clockwise direction. In the position of the cam 81 shown in FIG. 7, the distance between the sprockets 83 and 66 is at substantially a maximum and the sprocket 101 is forced into the chain 84 by the cam 81 and cam follower 107. Therefore there is substantially a minimum amount of slack taken up by the spring loaded takeup device 86 which is therefore moved in the counterclockwise direction. After the shaft 73 and the cam 81 have rotated approximately 180° from the position of FIG. 7 to the position shown in FIG. 9, the distance between the sprockets 66 and 83 is at substantially a minimum and the cam 81 pivots the sprocket 101 counterclockwise to the position where it exerts a substantial amount of inward force on the pulling side 97 of the chain 84. In the positions shown in FIGS. 6 and 7, the distance between the sprockets 66 and 83 is intermediate the maximum and minimum distances shown in FIGS. 7 and 9, respectively, and the sprocket 101 is cam-urged into the chain 84 a distance less than is the case for the position shown in FIGS. 7 and 9.

There are a number of factors affecting the rotary movement of the drive sprocket 66. For each revolution of the shaft 73, the sprocket 83 makes one complete revolution about its own axis. In this instance, the number of teeth on the sprocket 66 is twice the number of the teeth on the sprocket 83. Therefore, for each full revolution of the shaft 73 the sprocket 66 turns one-half a revolution.

In addition to the rotary movement of the sprocket 83, it also moves alternately away from and toward the drive sprocket 66 as the sprocket 83 rotates around the shaft 73, and the velocity of this movement follows substantially a sine-wave pattern.

In addition to the two foregoing movements, the cam actuated sprocket 101 moves the pulling side 97 of the chain 84 laterally as the cam 81 rotates. Movement of the sprocket 101 toward the left tends to rotate the sprocket 66 in the clockwise direction while movement toward the right tends to permit counterclockwise movement of the sprocket 66.

With reference to FIGS. 10 and 11, curve 111 shows the rotary displacement of the sprocket 66, and a corresponding linear displacement of the transfer arms 48, with time, curve 112 shows the velocity of the displacement with time, and curve 113 shows the acceleration of the displacement with time. The line indicated by the numeral 114 is chosen as zero time, or the beginning of a cycle. The displacement curve 111 is also shown in FIG. 11 along with the three motion components which when combined, result in a displacement as represented by the curve 111. Curves 116, 117 and 118 represent the motion components respectively due to rotation of the sprocket 83 about its own axis, rotation of the sprocket 83 about the axis of the shaft 73, and movement of the sprocket 101 and lateral movement of the chain 84 due to the shape of the cam 81. The beginning of a cycle, arbitrarily chosen at the line 114, is substantially at the time when sprockets 66 and 83 are closest together. Forward displacement as shown in FIG. 10, is most rapid near the beginning of the cycle. At the beginning of a cycle, maximum acceleration (curve 113) in the forward direction is obtained at the time indicated by the numeral 121. Forward acceleration then drops at the time indicated by the numeral 122, the velocity is at a maximum but the acceleration has reduced to zero and then displacement begins to accelerate in the reverse direction. The forward displacement then of course begins to slow down and after the time indicated by the numeral 123 the reverse acceleration is held constant. It will be noted from curve 113 that within the time interval represented by the numerals 123 to 124, the acceleration in the reverse direction is held substantially constant. At the time indicated by the numeral 126, the forward velocity is reduced to zero and then there is a short rearward displacement. With reference to the displacement curve 111, the maximum forward displacement is reached at the time indicated by the numeral 126 and then the rearward displacement takes place and at the time 127 rearward movement has stopped. After a brief pause in the movement of the drive sprocket 66 and the pusher arms 48 there is again forward displacement as a new cycle begins.

With reference to the velocity curve 112, the shaded area 128 from the top of the curve 112 at the time 122, downwardly and to the right, represents the velocity a package would have if the forward pushing action of the transfer arms 48 were suddenly to stop at the time 122. Since the velocity of a free package after the time 122 and its position at any time thereafter is dependent upon the coefficient of friction between the package and the surface over which it is moving, there is a range of possible velocities a package may have, due to the numerous factors affecting the coefficient of friction, as previously discussed. The velocity of a free package will generally be within the shaded area 128 and come to a stop between the times 131 and 132. As previously explained, this is undesirable because the movement of the package is out of control, and there is no assurance that the package will stop at the time and place desired. In accordance with this invention, the package is constantly being pushed by a transfer arm 48 because, as shown by the curve 112, between the times 122 and 126 the velocity of the transfer arm 48 will always be greater than the velocity of a free package. Therefore, the transfer arm will always be pushing the package regardless of the rate at which the package would slow down without the presence of the transfer arm. The package will thus always be engaged by the transfer arm and as soon as the transfer arm stops its forward motion, the package will also immediately stop. With reference to the displacement curve 111, the package will be moved to the point of maximum displacement indicated by the numeral 133 and the transfer arm will then quickly move rearwardly away from the package to the point 134, to permit undisturbed weighing or labeling of the package. The maximum forward displacement to the point 133 may for example, be thirteen inches and the rearward displacement may be approximately one inch.

It is desirable to maintain the sprocket 101 relatively close to one of the sprockets 66 and 83 so that a relatively small amount of pivotal motion of the arm 102 will result in a considerable amount of chain takeup. Therefore, a relatively small movement can be obtained with a relatively small size cam 81, which of course is desirable. The movement of the sprocket 101 depends on the throw of the cam 81 and ratio of the distance between the pin 108 and the pivot pin 104, to the distance between the pin 104 and the axis of rotation of the sprocket 101. Furthermore, the greater the distance between the axis of the shaft 73 and the center of the sprocket 83, relative to the radius of a sprocket 66, the greater will be both the forward and backward displacement of the transfer arms 48. In the construction shown in FIG. 4, this distance and this radius are equal.

The cam 81 as previously stated is generally egg shaped and the shaft 73 is positioned somewhat closer to one end of the cam 81 than the other. The outer peripheral surface of the cam 81 at the two ends of its major axis forms two enlarged cam surfaces 141 and 142 (see FIG. 6) and the axis of the shaft 73 and the center of the sprocket 83 are located substantially on the major axis of the cam 81. The distance from the shaft 73 to the surface 142 is less than the distance from the shaft 73 to the surface 141, and the sprocket 83 is located between the shaft 73 and the surface 142. The radius of the cam member 81 between the two surfaces 141 and 142 is reduced somewhat, and reaches its minimum value at approximately the locations indicated by the numerals 143 and 144. As shown in FIG. 11 at the time that the cam surface 141 pivots the sprocket 101 to move the pulling side 97 of the chain 84 toward the left, curve 117 is falling rapidly, and the displacement due to the cam 81, combined with the effect of the rotary motion of the sprocket 83, results in maintaining the chain 84 stationary. The pivotal movement of the sprocket 101 due to the cam surface 42 reduces the velocity at the beginning of each cycle.

The form of the invention shown in FIGS. 12, 13, 14 and 15 is similar to the embodiment described above with the exception that the cam 81 and the sprocket 101 including the arm 102 and the weight 106 are omitted. With reference to FIGS. 12 to 15, there is shown a drive sprocket 146 secured to shaft 147, the sprocket 146 and the shaft 147 corresponding to the sprocket 66 and the shaft 58 shown in FIG. 4. Another sprocket 148 is fixedly secured to one end of an arm 149, the other end of the arm 149 being secured to a main drive shaft 151. The shaft 151 corresponds to the main drive shaft 73 shown in FIG. 4. and the sprocket 148 corresponds generally to the sprocket 83 shown in FIG. 4. An endless chain 152 is trained around the sprockets 146 and 148 and a spring loaded takeup device 153. The device 153 comprises a bracket 154 having rotatably mounted thereon two takeup sprockets 156 and 157, the two sprockets 156 and 157 being located adjacent opposite ends of the bracket 154. The bracket 154 is pivotally mounted on the frame of the machine by means of a pivot pin 158 located between the two sprockets 156 and 157 similar to the mounting arm 97 of the takeup device 86.

The chain 152 is similar to the chain 84 and is rotated in the clockwise direction as the shaft 151 and the arm 149 are rotated in the clockwise direction. The chain 152 is trained around the upper side of the sprocket 146, downwardly and under the sprocket 148, then upwardly and over the sprocket 156, under the sprocket 157, and then upwardly to the sprocket 146. The downwardly moving section of the chain 152 between the sprockets 146 and 148 is referred to therein as the pulling section 159, and the section of the chain engaged by the takeup device 153 is referred to as the idling section 161. The takeup device 153 further includes a tension spring 162 which has one end secured to the bracket 154 and its other end secured to the lower portion of the frame of the machine. The connection between the spring 162 and the bracket 154 is to the right of the pivot pin 158 and therefore the spring 162 tends to pivot the bracket 154 in the clockwise direction and thereby maintain substantially constant tension on the chain 152.

As the shaft 151 and the arm 149 rotate in the clockwise direction, two factors affect the rotary movement of the chain 152 and the sprocket 146. First, for each revolution of the shaft 151 the sprocket 148 also makes one complete revolution about its own axis similar to the corresponding movement of the sprocket 83 shown in FIG. 4. Simultaneously with its rotary movement, the rotation about the axis of the shaft 151 causes the sprocket 148 to move toward and away from the sprocket 146 similar to the corresponding movement of the sprocket 83.

With reference to FIG. 16, the straight line 163 represents the displacement of the sprocket 146 due to rotation of the sprocket 148 about its own axis, and the sine wave like curve 164 represents the displacement due to the rotation of the sprocket 148 about the axis of the shaft 151. The combination of these two components is represented by the curve 166, FIGS. 16 and 17. Also shown in FIG. 17 are a velocity curve 167 and an acceleration curve 168, for the construction shown in FIGS. 12 to 15.

FIG. 15 shows the position of the drive at substantially the beginning of a cycle when the distance between the two sprockets 146 and 148 is at substantially a minimum. Clockwise movement of the arm 149 to the position shown in FIG. 12 results in clockwise movement in chain 152, and sprocket 146, and at approximately the time indicated by numeral 171 in FIG. 17, the velocity in the forward direction begins to decrease which corresponds to substantially the time when two sprockets 146 and 148 are at the maximum distance apart. Continued movement of the arm 149 through the position shown in FIG. 14 to the position shown in FIG. 15 results in the velocity, acceleration, and displacement curves 166 to 168. The time between the two lines indicated by the numerals 172 and 173 represents one complete cycle of the apparatus.

In the construction shown in FIGS. 12 to 15, which results in the motion shown in the curves of FIGS. 16 and 17, the distance between the axis of the shaft 151 and the center of the sprocket 148 is substantially equal to 0.75 times the radius of the sprocket 146. To obtain a displacement curve represented by the dashed line 174, FIG. 17, the distance between the shaft 151 and the center of the sprocket 148 should be substantially equal to the radius of the sprocket 146, and to retain the displacement curve represented by the dashed line 176 the distance between the axis of the shaft 151 and the center of the sprocket 148 should be substantially equal to one half of the radius of the sprocket 146. In the construction shown in FIGS. 12 to 15, the forward motion for each cycle is again approximately 12 inches while the rearward motion or displacement is approximately 1.3 inches.

In the form shown in FIG. 4, if it is desired to change the total time of the cycle or the proportion of parts of a cycle relative to each other, it is obvious that such changes may be made by changing the speed of the motor 67, the ratio of the sprockets 83 and 66, the ratio of the length of the arm from the center of the sprocket 83 to the axis of the main drive shaft 73, to the radius of the sprocket 66, the shape and size of the cam 81, and the ratio of the lengths of the arms 106 and the arm 102. Similar changes may be made for the form shown in FIGS. 12 to 15, where applicable.

From the foregoing it will be apparent that an improved drive mechanism for a transfer and labeling machine has been provided. Due to the unique drive mechanism, the packages are moved forwardly from one station to the next at a relatively fast speed while, at the same time, control over the movement of the packages is maintained. This is obtained by accelerating the packages at the beginning of each cycle and then decelerating at a substantially constant rate whereby the velocity of the transfer arms is at least as great as the velocity of a free package when it is slowing down from the position of maximum velocity. Since the velocity of the transfer arm is always at least as great as that of a free package, the package will always be engaged and pushed by the associated transfer arm, and consequently when the transfer arm comes to a stop in its forward motion the package movement is terminated.

What is claimed is:

1. A transfer and labeling machine comprising means forming a package transport path, at least one transfer arm for moving a package along said path, and a drive for cyclically moving said arm along said path, said drive including drive means for moving said arm forwardly along said path during the first portion of a cycle with said arm having a predetermined forward velocity at the end of said first portion, said drive means then being operable for decreasing the forward velocity of said arm during a second portion of the cycle until said arm reaches a zero forward velocity, and said drive means being operable immediately thereafter during a third portion of the cycle for moving said arm rearwardly a predetermined distance, the forward velocity of said arm at any selected instant during said second portion being at least as great as the velocity at a corresponding instant that a free package sliding along said path would have if such free package were accelerated to said predetermined forward velocity and were then permitted to slide freely, whereby said arm is adapted to engage the package throughout said second portion and to disengage said package during said third portion.

2. A transfer and labeling machine comprising means forming a package transport path, at least one transfer arm for moving a package along said path, and a drive for cyclically moving said arm along said path, said drive including drive means for rapidly increasing the velocity of said arm in a forward direction to a maximum value during the first portion of a cycle, then decreasing the forward velocity of said arm until said arm comes to an initial stop, increasing the velocity of said arm in the rearward direction and then decreasing the rearward velocity until said arm comes to a final stop, the forward velocity of said arm at any selected instant during the portion of the cycle when the forward velocity is decreasing being at least as great as the velocity at a corresponding instant that a free package sliding along said transport path would have, which has been accelerated to said maximum velocity value and then permitted to slide freely.

3. Apparatus as in claim 2 wherein said drive means is operable for decelerating said arm at a substantially constant rate from the time of said maximum velocity to the time of said final stop.

4. Apparatus as in claim 2, wherein said drive means is operable to effect a decrease in the velocity in the forward direction of said arm immediately preceding the time of said initial stop at a rate which is substantially equal to the rate of increase in the velocity in the rearward direction immediately subsequent to the time of said initial stop.

5. Apparatus as in claim 2, wherein said drive means comprises a rotatable main drive shaft adapted to be rotated by a drive motor, an arm having one end secured to said shaft, a first sprocket secured to the other end of said arm, a second sprocket, means for rotatably mounting said second sprocket and for moving said transfer arm upon rotation of said second sprocket, a chain trained around said sprockets and having a pulling side and an idling side, and a slack take up device engaging said idling side of said chain.

6. Apparatus as in claim 2, wherein said second sprocket has substantially twice the number of teeth as said first sprocket, and the radius of said second sprocket is substantially the same as the distance from the center of said drive shaft to the center of said first sprocket.

7. Apparatus as in claim 5, wherein said drive means further comprises a cam sprocket engaging the pulling side of said chain, a cam connected to be rotated by said main drive shaft, and means for rotatably supporting said cam sprocket and engaging said cam such that rotation of said cam causes said cam sprocket to move transversely of said pulling side of said chain.

8. Apparatus as in claim 7, wherein said arm and said cam are formed integrally with each other.

9. Apparatus as in claim 5, wherein displacement of said transfer arm due to rotation of said first sprocket about its own axis varies as a straight line with time, and the displacement of said transfer arm due to rotation of said first sprocket about the axis of said main drive shaft varies as a sine wave with time, the sum of said two displacements providing said cyclical movement of said arm and said velocity increases and decreases.

10. Apparatus as in claim 7, wherein displacement of said transfer arm due to rotation of said first sprocket about its own axis varies as a straight line with time, the displacement of said transfer arm due to rotation of said first sprocket about the axis of said shaft varies as a first sine wave with time, and the displacement of said transfer arm due to rotation of said cam varies generally as two cycles of a second sine wave, the amplitude of said first sine wave being substantially greater than the amplitude of said second sine wave, and the amplitude of the second cycle of said second sine wave being greater than the amplitude of the first cycle of said second sine wave, the sum of said displacements providing said cyclical movement of said arm and said velocity increases and decreases.

11. Apparatus as in claim 10, wherein the deceleration of said transfer arm is substantially constant from the time of said maximum velocity to the time of said final stop.

12. Apparatus as in claim 5, wherein the acceleration and deceleration of said transfer arm is substantially a sine wave from the time of said maximum velocity to the time of said initial stop.

13. Apparatus as in claim 12, wherein the acceleration and deceleration of said transfer arm is substantially a sine wave from the time of said initial stop to the time of said final stop.

14. Apparatus as in claim 7, wherein said cam is generally egg shaped, and its axis of rotation is located substantially on its major axis and closer to one end than to its other end.

15. Apparatus as in claim 7, wherein said supporting means comprises an elongated cam arm which carries said cam sprocket at one end and is pivotally mounted at its other end, a bracket secured to said cam arm, and a cam follower rotatably mounted on said bracket and engaging said cam, said cam arm and said bracket being weighted to urge said cam sprocket against said chain.

References Cited by the Examiner
UNITED STATES PATENTS

| | | | |
|---|---|---|---|
| 1,116,406 | 11/1914 | Fleischer | 198—110 |
| 3,203,533 | 8/1965 | Hauer | 198—110 |

EVON C. BLUNK, *Primary Examiner.*

R. E. AEGERTER, *Assistant Examiner.*